United States Patent
Desai et al.

(10) Patent No.: US 9,756,114 B2
(45) Date of Patent: Sep. 5, 2017

(54) ASYNCHRONOUS RESPONSE PROCESSING IN A WEB BASED REQUEST-RESPONSE COMPUTING SYSTEM

(75) Inventors: Vikram A. Desai, Wexford, PA (US); Sai G. Rathnam, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 937 days.

(21) Appl. No.: 11/944,566

(22) Filed: Nov. 23, 2007

(65) Prior Publication Data
US 2009/0138545 A1 May 28, 2009

(51) Int. Cl.
H04L 29/08 (2006.01)
H04L 29/06 (2006.01)

(52) U.S. Cl.
CPC .............. *H04L 67/06* (2013.01); *H04L 67/28* (2013.01); *H04L 67/42* (2013.01)

(58) Field of Classification Search
CPC .......... H04L 67/06; H04L 67/28; H04L 67/42
USPC ................. 709/201–203, 206, 219, 224, 232
See application file for complete search history.

(56) References Cited

U.S. PATENT DOCUMENTS

| | | | |
|---|---|---|---|
| 5,987,504 A * | 11/1999 | Toga ...................... H04L 12/58 709/203 |
| 6,185,542 B1 * | 2/2001 | Moran et al. ................... 705/16 |
| 6,457,879 B1 * | 10/2002 | Thurlow et al. ............... 709/206 |
| 6,672,775 B1 * | 1/2004 | Narayanaswami ........... 709/219 |
| 6,754,621 B1 | 6/2004 | Cunningham et al. |
| 6,789,119 B1 * | 9/2004 | Zhu et al. ...................... 709/227 |
| 6,934,738 B1 * | 8/2005 | Furusawa et al. ............ 709/206 |
| 6,968,394 B1 * | 11/2005 | El-Rafie .................. H04L 69/16 455/3.01 |
| 7,058,600 B1 * | 6/2006 | Combar ............ G06F 17/30893 379/114.03 |
| 7,124,173 B2 * | 10/2006 | Moriarty ............. H04L 63/0236 709/219 |
| 7,177,628 B2 * | 2/2007 | Sommers et al. ......... 455/414.1 |
| 7,228,438 B2 * | 6/2007 | Bushmitch et al. .......... 713/193 |
| 7,356,557 B2 * | 4/2008 | Kikuchi et al. ............... 709/201 |
| 7,376,722 B1 * | 5/2008 | Sim et al. ..................... 709/223 |
| 7,398,080 B2 * | 7/2008 | Pyhälammi et al. ...... 455/412.1 |
| 7,600,011 B1 * | 10/2009 | Urbanek ........... H04L 29/12066 709/203 |

(Continued)

OTHER PUBLICATIONS

Allbusiness.com, "How Does E-Mail Work?", Dec. 18, 2006, retrieved from <http://web.archive.org/web/20061218105651/http://www.allbusiness.com/technology/computer-software-productivity-applications/1395-1.html>.*

*Primary Examiner* — Larry Donaghue
(74) *Attorney, Agent, or Firm* — Steven M. Greenberg, Esq.; CRGO Law

(57) ABSTRACT

Embodiments of the present invention address deficiencies of the art in respect to asynchronous web based request-response handling and provide a method, system and computer program product for asynchronous response handling in a web based request-response computing system. In an embodiment of the invention, a method for asynchronous response handling in a web based request-response computing system can be provided. The method can include inserting an address of an intermediate response server in a request, transmitting the request to a target processing server separate from the intermediate response server, and polling the intermediate response server for a response.

20 Claims, 1 Drawing Sheet

(56) References Cited

U.S. PATENT DOCUMENTS

| | | | |
|---|---|---|---|
| 8,990,396 B2* | 3/2015 | Zilbershtein | H04L 67/06 370/261 |
| 2002/0059463 A1* | 5/2002 | Goldstein | 709/247 |
| 2002/0078371 A1* | 6/2002 | Heilig et al. | 713/200 |
| 2002/0091787 A1* | 7/2002 | Igarashi | 709/213 |
| 2002/0112008 A1* | 8/2002 | Christenson et al. | 709/206 |
| 2003/0061387 A1* | 3/2003 | Brown | H04L 63/02 709/246 |
| 2003/0154256 A1* | 8/2003 | Hadano et al. | 709/206 |
| 2003/0200329 A1* | 10/2003 | Delaney et al. | 709/237 |
| 2004/0006616 A1* | 1/2004 | Quinn et al. | 709/223 |
| 2004/0078486 A1* | 4/2004 | Salahshoor | H04L 67/42 709/245 |
| 2004/0153712 A1* | 8/2004 | Owhadi | G06F 11/0709 714/4.2 |
| 2004/0267638 A1* | 12/2004 | Giunta | 705/27 |
| 2005/0010648 A1* | 1/2005 | Ramaswamy et al. | 709/217 |
| 2005/0038874 A1* | 2/2005 | Ramaswamy | H04L 29/06 709/219 |
| 2005/0091323 A1* | 4/2005 | Smith et al. | 709/206 |
| 2005/0149569 A1* | 7/2005 | Hariharan et al. | 707/104.1 |
| 2005/0193135 A1* | 9/2005 | Owen et al. | 709/230 |
| 2005/0234928 A1* | 10/2005 | Shkvarchuk | H04L 67/2823 |
| 2006/0112398 A1* | 5/2006 | Mukkamala et al. | 719/316 |
| 2006/0155810 A1* | 7/2006 | Butcher | 709/206 |
| 2007/0067389 A1* | 3/2007 | Bedi | H04L 67/26 709/204 |
| 2007/0073884 A1* | 3/2007 | Clarke | G06F 9/542 709/226 |
| 2008/0242269 A1* | 10/2008 | Lee et al. | 455/412.1 |
| 2008/0244033 A1* | 10/2008 | Hook | G06F 17/30017 709/217 |
| 2009/0119361 A1* | 5/2009 | Burckart | G06F 17/30902 709/203 |
| 2009/0247208 A1* | 10/2009 | Lohmar | H04L 12/189 455/519 |

\* cited by examiner

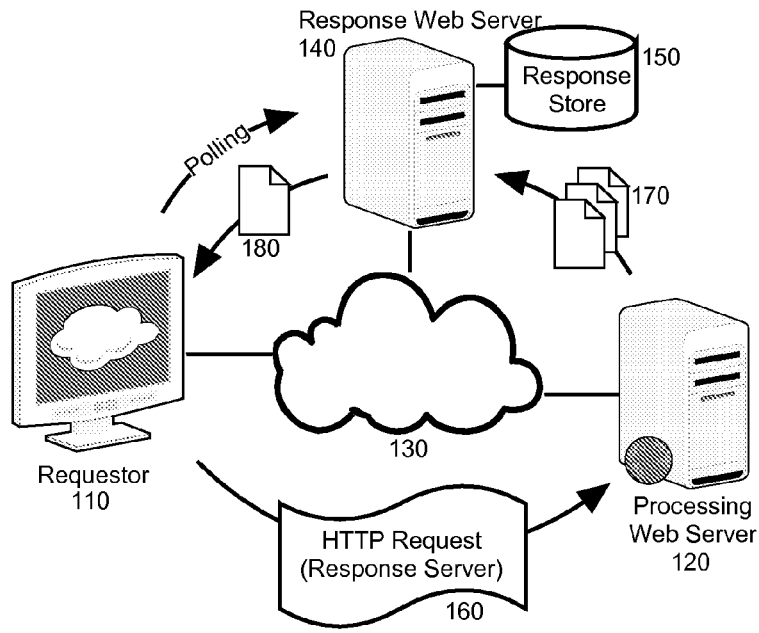
FIG. 1
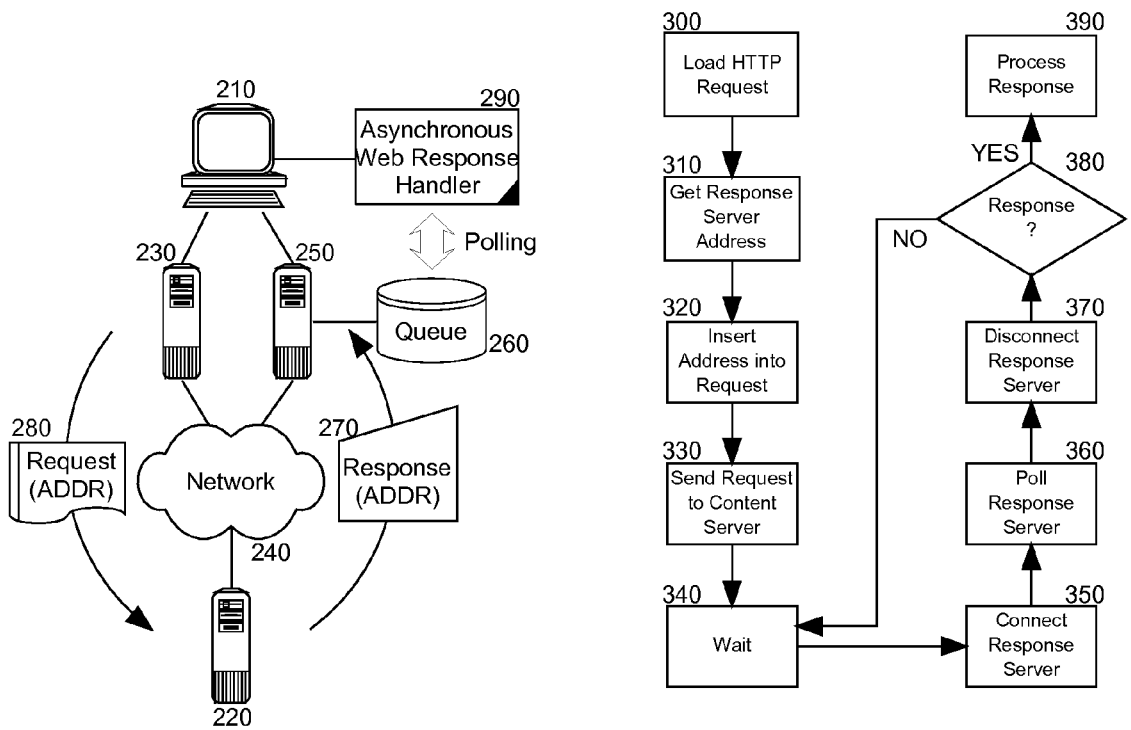
FIG. 2
FIG. 3

ASYNCHRONOUS RESPONSE PROCESSING IN A WEB BASED REQUEST-RESPONSE COMPUTING SYSTEM

BACKGROUND OF THE INVENTION

Field of the Invention

The present invention relates to the field of request-response processing in web based computing system, and more particularly to queuing asynchronously produced responses for delivery to a hypertext transfer protocol (HTTP) client in a request-response computing system.

Description of the Related Art

A request-response computing system refers to a computing system configured to receive requests from requesting clients, to process those requests and to provide some sort of response to the requesting clients over a computer communications network. Traditionally web based requests have been synchronous in nature primarily because in the HTTP protocol, the server cannot push responses back to the client. Rather, the HTTP client initiates a request that creates a connection to the server, the server processes the request and sends back the response on the same connection. In web based computing, however, it may be required to have an asynchronous request response pattern of invocation, meaning that the timing of a response to a request can occur at any time subsequent to the receipt of a request.

In a Web based request response computing system, once a request is received in a processing server, the processing server cannot respond to the requester until a response is ready. However, in a asynchronous pattern, while the request is pending, a continuous communications connection is not maintained as between the requestor and the request recipient. Rather, once the response is ready, the response can be forwarded to the requestor. Though not necessarily apparent to the casual observer, though, in many cases, the recipient of the request—namely the processing server—does not proactively forward the response to the requestor according to a push paradigm. Rather, the requester must pull the response as the response becomes available in the processing server according to a pull paradigm.

To simulate a push paradigm, ordinarily the requestor will periodically poll the processing server to determine whether or not a response is ready. Once the response is ready, the requester can actively retrieve the response during a connection with the processing server associated with the polling operation. Thus, for many requests, multiple different connections must be established between the requestor and the processing server in order to achieve effective polling. While more connections during polling can simulate a continuous connection, establishing a connection can be a resource consumptive operation.

Presuming some granularity in the periodicity of connections during polling, a period of time can and in most cases will elapse between the response becoming available and the response being retrieved from the processing server by the requester. During this period of time, the response can be placed in a queue by the recipient of the request. Clearly then, the queuing of a multitude of responses for multiple different requests in the processing server can be resource consumptive and wasteful and can overburden the processing server, especially if the processing server receives a large number of requests for a deferred (asynchronous) response. Additionally, the repeated connections established during polling can burden the processing server.

BRIEF SUMMARY OF THE INVENTION

Embodiments of the present invention address deficiencies of the art in respect to asynchronous web based request-response handling and provide a novel and nonobvious method, system and computer program product for asynchronous response handling in a web based request-response computing system. In an embodiment of the invention, a method for asynchronous response handling in a web based request-response computing system can be provided. The method can include inserting an address of an intermediate response web server in a request, transmitting the request to a target processing web server separate from the intermediate response web server, and polling the intermediate response web server for a response to the request instead of polling the target processing web server for a response to the request. This effectively reduces the resource consumption on the processing web server by offloading the response payloads and overhead caused by repeated connections required during polling.

In one aspect of the embodiment, inserting an address of an intermediate response server in a request can include inserting an address of an intermediate response web server in a hypertext transport protocol (HTTP request). In another aspect of the embodiment, transmitting the request to a target processing web server separate from the intermediate response web server can include transmitting the request to a target processing web server separate from the intermediate response web server via a proxy server in a same local network as the intermediate response web server. In yet another aspect of the embodiment, polling the intermediate response web server for a response to the request instead of polling the target processing web server for a response to the request can include opening a http connection with the intermediate response web server, determining whether a response is received for the request, closing the http connection, and repeating the opening, the determining and the closing until a response is determined to have been received for the request.

In another embodiment of the invention, an asynchronous request-response data processing system can be provided. The system can include a requesting client communicatively coupled to a processing server over a computer communications network, a response web server intermediately disposed between the requesting client and the processing server, and an asynchronous response handler coupled to the requesting client. The response handler can include program code enabled to insert an address for the response server in a request for processing in the processing server, and to poll the response web server for a response to the request instead of polling the processing web server for a response to the request.

In one aspect of the embodiment, the requesting client can be a Web browser executing in client computer. In another aspect of the embodiment, the request can be an HTTP request. In yet another aspect of the embodiment, the processing server can be a Web server. Notably, a queue can be managed by the response server. Where a queue is provided, the response server can store responses from the processing server in the queue until delivered to the requesting client during polling. Yet further, the response server can be disposed within the same local area network as a proxy server acting on behalf of the requesting client.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for asynchronous response handling in a request-response computing system;

FIG. 2 is a schematic illustration of a request-response computing system configured for asynchronous response handling; and, FIG. 3 is a flow chart illustrating a process for asynchronous response handling in a request-response computing system.

DETAILED DESCRIPTION OF THE INVENTION

Embodiments of the present invention provide a method, system and computer program product for asynchronous response handling in a web based request-response computing system. In accordance with an embodiment of the present invention, an intermediate response web server can be disposed between a requester and a processing server in a request-response computing system. A request forwarded by the requestor to the processing server can be modified to indicate a return address to the intermediate response server. Thereafter, the requester can poll the intermediate response web server and not the processing server for a response. The processing server in turn can queue the response in the intermediate response server as directed by the request. In this way, resource consumption associated with the queuing and polling operations can be offloaded onto the intermediate response Web server. The processing Web server serves requests from all Web clients but the intermediate response Web server could be limited to specific clients.

In illustration, FIG. 1 pictorially depicts a process for asynchronous response handling in a request-response computing system. As shown in FIG. 1, a requestor 110 can issue a request 160 for content and/or processing to processing server 120 over computer communications network 130. The request 160 can be a hypertext transfer protocol (HTTP) request as is well-known in the art. The request 160 can be modified to include a return address for a response to the request 160. The return address can be a uniform resource locator (URL) and can specify a network address for communicatively coupled response server 140. In this regard, the response server 140 can be associated with the requester 110, for example a server executing within or in association with a proxy server for the requestor 110.

Once the requestor 110 has issued the request 160 to the processing server 120, the requester 110 can poll the response server 140 for a response 180. Concurrently, the processing server 120 can issue any responses to the response server 140. The response server 140 in turn can store the responses 170 in queue 150. Once a response 180 has been received for the request 160, the response 180 can be routed from the response server 140 to the requester 110 in response to polling by the requester 110. In this way, the resource consumption resulting from the polling can be diverted from the processing server 120 to the response server 140 in an asynchronous request-response computing system.

In further illustration, FIG. 2 schematically depicts a request-response computing system configured for asynchronous response handling. As shown in FIG. 2, the system can include a requesting client 210 coupled to a gateway 230 communicatively linked to a processing server 220 over computer communications network 240. In particular, the processing server 220 can include a content server or application server, to name only two examples, configured to process HTTP requests received from over the computer communications network 240. In one aspect of the embodiment, the gateway 230 can be a proxy server configured to proxy requests to the processing server 220 on behalf of the requesting client 210.

An intermediate response server 250 can be disposed intermediately between the requesting client 210 and the processing server 220. The intermediate response server 250 can include a queue 260 into which responses 270 from the processing server 220 can be stored when ready and during a polling interval in the requesting client 210. In this regard, an asynchronous response handler 290 can be coupled to the requesting client 210. The asynchronous response handler 290 can include program code enabled to insert an address for the response server 250 in each request 280 to the processing server 220 for the requesting client 210.

In consequence, the processing server 220 asynchronously can return a response 270 to the response server 250 instead of the requesting client 210. The program code of the asynchronous response handler 290 further can be enabled to poll the response server 250 to determine when a response 270 to the request 280 is received and to retrieve the response 280 for the requesting client 210. As such, the periodic and continuous polling of the asynchronous response handler 290 can be directed at the response server 250 and not the processing server 220 thereby relieving the processing server 220 of the resource consumption of queuing responses for the requesting client 210 and managing connections and disconnections with the requesting client 210. Additionally, the memory required to store the deferred response is reduced independent of polling.

In yet further illustration of the operation of the asynchronous response handler 290, FIG. 3 is a flow chart illustrating a process for asynchronous response handling in a request-response computing system. Beginning in block 300 a request can be loaded for processing in an asynchronous request-response computing system. In block 310, a response server address can be retrieved and the response server address can be inserted into the loaded request in block 320. In block 330 the request can be sent to a target processing server and in block 340 a delay can be incurred before polling of the response server is to commence. Specifically, a request can be received from the client with an embedded response Web server address in the form of a URL and the request can be processed. Thereafter, a Web request to the response Web server can be made with the deferred response before disconnecting.

In block 350, polling can commence with a connection to the response server and in block 360 the response server can be polled to determine whether a response has been received for the request. Thereafter, in block 370 the connection with the response server can be released and in decision block 380, it can be determined whether a response has been received for the request. If not, the process can return to block 340 for another delay before the polling cycle can continue. Once a response is retrieved for the request, in block 390 the response can be processed.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. With specific reference to a computer usable storage medium, it is to be understood that a computer usable storage medium excludes transitory media such as transitory signals and other propagation media.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method, within a client computer device, for asynchronous response handling in a web based request-response computing system, the method comprising:
    receiving in a client computer an HTTP request directed to a target processing server;
    inserting in the request by the client computer, a return address of an intermediate response server different than the target processing server in replacement of a return address of the client computer, the address being a uniform resource locator (URL) specifying a network address for the intermediate response server;
    transmitting by the client computer the request to the target processing server and then disconnecting from the target processing server;
    incurring a delay subsequent to the transmitting and then diverting resource consumption resulting from polling of the target processing server by polling by the client computer device of the intermediate response server to determine if a response has been received in the intermediate response server to the request transmitted to the target processing server rather than the client computer device polling the target processing server directly for a response to the request; and,
    on condition that the response is detected in a queue of the intermediate response server, receiving the response to the request in the client computer from the intermediate response server instead of the target processing server, but on condition that the response is not detected in the queue of the intermediate response server, incurring a delay and repeating the polling of the intermediate response server for the response to the request transmitted to the target processing server.

2. The method of claim 1, wherein
the inserting the address comprises inserting the address of the intermediate response server in a hypertext transport protocol (HTTP) request.

3. The method of claim 1, wherein
the request is transmitted to the target processing server separate from the intermediate response server via a proxy server in a same local network as the intermediate response server.

4. The method of claim 1, wherein
the polling the intermediate response server comprises:
    opening a connection with the intermediate response server;
    determining whether a response is received for the request;
    closing the connection; and,
    repeating the opening, the determining and the closing until a response is determined to have been received for the request.

5. The method of claim 1, further comprising concurrently issuing the response to the request by the target processing server to the intermediate response server instead of issuing the response to the request to the client computer device, while also polling the intermediate response server for the response to the request.

6. The method of claim 1, further comprising reducing a resource consumption for the target processing server by polling the intermediate response server for the response to the request instead of polling the target processing server for the response to the request and also relieving the target processing server of managing connections and disconnections with the client computer device.

7. An asynchronous request-response data processing system comprising:
    a requesting client communicatively coupled to a processing server over a computer communications network;
    a response server intermediately disposed between the requesting client and the processing server; and,
    an asynchronous response handler coupled to the requesting client, the response handler comprising program code enabled to
        receive in the requesting client an HTTP request directed to a target processing server;
        insert in the HTTP request by the requesting client a return web address for the response server in replacement of a return address of the requesting client, the web address being a uniform resource locator (URL) specifying a network address for the response server, transmit by the requesting client the HTTP request to the processing server and then disconnect from the target processing server, incur a delay subsequent to the transmitting and then divert resource consumption resulting from polling of the processing server by polling by the response handler of the requesting client instead of the response server to determine if a response has been received in the intermediate response server to the HTTP request transmitted to the target processing server rather than the requesting client polling the processing server directly for a response to the request, and on condition that the response is detected in a queue of the intermediate response server, receive the response to the HTTP request in the requesting client from the response server instead of the target processing server, but on condition that the response is not detected in the queue of the intermediate response server, incurring a delay and repeating the polling of the intermediate response server for the response to the request transmitted to the target processing server.

8. The system of claim 7, wherein
the requesting client is a Web browser executing in client computer.

9. The system of claim 7, wherein
the request is a hypertext transfer protocol (HTTP) request.

10. The system of claim 7, wherein
the processing server is a Web server.

11. The system of claim 7, further comprising
a queue managed by the response server, the response server storing responses from the processing server in the queue until delivered to the requesting client during polling.

12. The system of claim 7, wherein
the response server is disposed in a same local area network as a proxy server acting on behalf of the requesting client.

13. The system of claim 7, wherein the asynchronous response handler further comprises program code enabled to concurrently issue the response to the request by the processing server to the response server instead of issuing the response to the request to the requesting client, while also polling the response server for the response to the request.

14. The system of claim 7, wherein the asynchronous response handler further comprises program code enabled to reduce a resource consumption for the processing server by polling the response server for the response to the request instead of polling the processing server for the response to the request and also to relieve the processing server of managing connections and disconnections with the requesting client.

15. A computer program product comprising a computer usable storage medium having stored thereon computer usable program code for asynchronous response handling in a request-response computing system, the computer usable program code, when executed on a client computer device, causing the client computer device to perform the operations of:

receiving in a client computer an HTTP request directed to a target processing server;

inserting in the request by the client computer, a return address of an intermediate response server different than the target processing server in replacement of a return address of the client computer, the address being a uniform resource locator (URL) specifying a network address for the intermediate response server;

transmitting by the client computer the request to the target processing server and then disconnecting from the target processing server;

incurring a delay subsequent to the transmitting and then diverting resource consumption resulting from polling of the target processing server by polling by the client computer device of the intermediate response server to determine if a response has been received in the intermediate response server to the request transmitted to the target processing server rather than the client computer device polling the target processing server directly for a response to the request; and, on condition that the response is detected in a queue of the intermediate response server, receiving the response to the request in the client computer from the intermediate response server instead of the target processing server, but on condition that the response is not detected in the queue of the intermediate response server, incurring a delay and repeating the polling of the intermediate response server for the response to the request transmitted to the target processing server.

16. The computer program product of claim 15, wherein
the inserting the address comprises computer usable program code for inserting the address of the intermediate response server in a hypertext transport protocol (HTTP) request.

17. The computer program product of claim 15, wherein
the request is transmitted to the target processing server separate from the intermediate response server via a proxy server in a same local network as the intermediate response server.

18. The computer program product of claim 15, wherein
the polling the intermediate response server comprises:
opening a connection with the intermediate response server;
determining whether a response is received for the request;
closing the connection; and,
repeating the opening, the determining and the closing until a response is determined to have been received for the request.

19. The computer program product of claim 15, further comprising computer usable program code causing the client computer device to perform the operation of concurrently issuing the response to the request by the target processing server to the intermediate response server instead of issuing the response to the request to the client computer device, while also polling the intermediate response server for the response to the request.

20. The computer program product of claim 15, further comprising computer usable program code causing the client computer device to perform the operation of reducing a resource consumption for the target processing server by polling the intermediate response server for the response to the request instead of polling the target processing server for the response to the request and also relieving the target processing server of managing connections and disconnections with the client computer device.

* * * * *